United States Patent

[11] 3,588,561

[72] Inventors William R. Hoffmeyer
Holland;
Alvin L. Rediger, Zeeland, Mich.
[21] Appl. No. 840,188
[22] Filed July 9, 1969
[45] Patented June 28, 1971
[73] Assignee General Electric Company

[54] DYNAMOELECTRIC MACHINE STATOR AND LAMINATIONS FOR USE IN SAME
9 Claims, 4 Drawing Figs.

[52] U.S. Cl. .................................................. 310/216, 310/259
[51] Int. Cl. .................................................. H02k 1/06
[50] Field of Search ........................................ 310/42, 91, 216, 217, 218, 254, 258, 259

[56] References Cited
UNITED STATES PATENTS
2,011,060  8/1935  Leland ........................ 310/258
2,792,512  5/1957  Koch ........................... 310/258

Primary Examiner—D. F. Duggan
Attorneys—John M. Stoudt, Radford M. Reams, Frank L. Neuhauser, Oscar B. Waddell, Ralph E. Krisher, Jr. and Joseph B. Forman ABSTRACT: A dynamoelectric machine stator core of stacked laminations includes a yoke section, a bore inside the yoke section and winding receiving slots extending inwardly from the yoke section. A first mounting opening is formed in the core outside the slots while second and third mounting openings are formed in core material radially outward of the yoke section. The angular distance between the first mounting opening and each of the second and third mounting openings is greater than the angular distance between the second and third mounting openings. The laminations are so shaped and formed that a number of individual laminations are severed in nested relationship from a single strip of magnetic material.

PATENTED JUN28 1971

3,588,561

INVENTORS:
William R. Hoffmeyer,
Alvin L. Rediger,
BY Radford M. Reams
Attorney.

DYNAMOELECTRIC MACHINE STATOR AND LAMINATIONS FOR USE IN SAME

BACKGROUND OF THE INVENTION

This invention relates to a dynamoelectric machine stator and laminations for use in the same which permits effective material utilization, efficient manufacture of the stator and efficient operation of the dynamoelectric machine.

In many dynamoelectric machines the stator is press fit into a surrounding case. Thus the stator laminations may be round and with a diameter just large enough to provide the proper yoke area. This provides an efficient utilization of material within the motor; however, the stator lamination shape may be varied somewhat to efficiently use the magnetic material from which they are made by severing a number of laminations in nested relationship from a single sheet or strip of material. One such configuration and nesting arrangement is shown and described in U.S. Pat. No. 3,154,708, issued to Paul B. Shaffer on Oct. 21, 1964, and assigned to General Electric Company, the assignee of the present invention.

In a number of applications such as, for instance, hermetic motors the stator normally is mounted in the overall device by bolts or equivalent means which pass through mounting openings in the stator. If these mounting openings are provided in the yoke section, they reduce the effectiveness of the yoke as a magnetic path and the motor size must be increased to give equivalent operational characteristics. Also, the bolts will be so close to the stator winding end turns as to make mounting without damage to the end turns very difficult. A number of angularly spaced apart outwardly extending tabs can be provided, as disclosed in U.S. Pat. No. 2,011,060, with the mounting openings formed therein. However, this unduly increases the overall dimensions of the stator and causes substantial waste of magnetic material when forming the laminations in that it tends to prevent close nesting of lamination blanks during manufacture of the core.

SUMMARY OF THE INVENTION

It is accordingly an object of the present invention to provide an improved dynamoelectric machine stator.

It is another object of this invention to provide such an improved stator which effectively utilizes the magnetic material of the stator laminations for efficient motor operation.

It is still another object of this invention to provide laminations for such a stator construction which effectively utilize the sheet of magnetic material from which the laminations are formed.

It is a still further object of the present invention to provide laminations which may be efficiently severed in nested relation from a single sheet of magnetic material.

In carrying out the objects in one form, we provide an improved dynamoelectric machine stator having a core of magnetic material. The core includes a yoke section, a bore disposed radially inward of the yoke section and a plurality of spaced apart elongated winding receiving slots extending inwardly from the yoke section. The core has a first longitudinally extending mounting opening disposed radially outward of the slots, and second and third longitudinally extending mounting openings disposed radially outward of the yoke section. The angular distance between the first mounting opening and each of the second and third mounting openings respectively is somewhat greater than the angular distance between the second and third mounting openings.

In one form of manufacturing laminations for the stator from a sheet of magnetic material, a plurality of bores are formed in evenly spaced staggered rows. A pair of cutouts are punched out spaced from each bore to form a pair of projections associated with each bore. One such projection is provided on each side of each row of bores, between each successive pair of bores. The magnetic material is then severed between each cutout and the next adjacent cutouts intermediate the rows. A first mounting opening is punched generally in alignment with each row of bores and generally between each pair of projections and second and third mounting openings are punched in respective ones of each pair of projections. Then the magnetic material is severed between each pair of cutouts along a line disposed between the associated first mounting opening and the associated second and third mounting openings.

In this way it is possible to provide a dynamoelectric machine stator which makes efficient and effective use of the stator material and provides efficient machine operation while, at the same time, effectively and efficiently utilizing the magnetic sheet material from which the stator laminations are made.

The subject matter which we regard as our invention is particularly pointed out and distinctly claimed in the concluding portion of this specification. Our invention, itself, however, both as to its organization and method of operation, together with further objects and advantages thereof may be best understood by reference to the following description taken in connection with the accompanying drawing, wherein:

DESCRIPTION OF THE PREFERRED EMBODIMENTS

Figure 1:
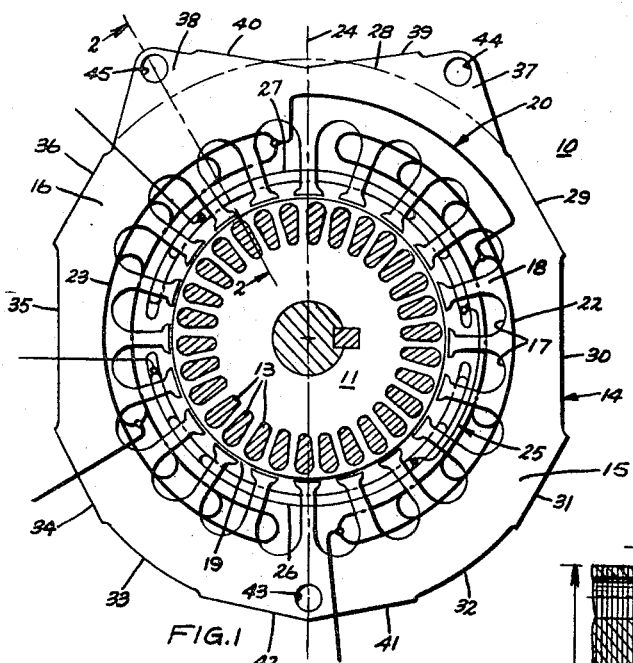
FIG. 1 is a front view embodying one form of the present invention, with concentric main and auxiliary windings schematically illustrated on the stator.

Referring now to the drawing in more detail and in particular to FIG. 1, for purposes of explanation and disclosure, one form of the invention has been illustrated in connection with a stator 10 for use in a single-phase alternating current induction resistance split phase type electric motor designed for a two-pole operation. The motor also includes a conventional rotor or secondary member 11 which is mounted on a shaft 12 and is provided with a squirrel cage winding generally indicated at 13. More specifically, as seen in the embodiment revealed in FIG. 1, the stator includes a laminated core 14 formed of a predetermined number of identical stacked laminations 15 (see FIG. 2) punched or stamped from a sheet of suitable magnetic material.

For convenience and simplicity of disclosure the same designations will be used hereafter to identify components of the individual laminations and the corresponding core structure formed when the laminations are placed together in stacked relation. Each lamination includes perforations and recesses which, when aligned, form the core now to be described. Still referring to FIG. 1, the core 14 includes an outer, generally circular or ringlike yoke section 16 and elongated winding receiving slots 17 extending inwardly therefrom. Teeth sections 18 are disposed between the slots 17 and define a cylindrical rotor receiving bore 19, which is disposed radially inwardly of the yoke section.

The slots are distributed circumferentially around the core, and main winding 20 is accommodated in the slots and insulated therefrom by a thin cover or slot liner 21 (FIG. 2) of insulating material disposed over the slot walls and core sides to prevent grounding of the winding. The main winding has two polar coil groups 22 and 23 which are respectively received in predetermined ones of the slots in a well-known distributed manner and define an axis 24 extending between their adjacent ends. An auxiliary winding 25, a start winding in the illustrated exemplification, is provided and consists of two coil groups 26 and 27 which are distributively wound in predetermined ones of the slots 17 angularly offset 90 electrical degrees with respect to the main winding to provide a quadrature start winding arrangement.

The arc 28 indicates the radius of a round stator having operational characteristics generally equivalent to the illustrated stator. It will be noted that the segments 29, 30, 31, 32, 33, 34, 35, and 36 of the outer peripheral surface or edge of the core 14 are either very short cords or are arcs of circles having radii which are the same as or closely approximate the radius of arc 28 so that the yoke section 16 closely approximates the yoke section of a generally equivalent round stator. The core also includes a pair of projections 37 and 38 which extend radially outwardly beyond the yoke section 16. The segments 39 and 40 of the outer periphery of the core between the projections 37 and 38 are generally V-shaped and at their apex extend inwardly of the arc 28 adjacent the axis 24. It will be noted that, adjacent the other end of the axis 24, the segments 41 and 42 of the core periphery are generally V-shaped and have their apex disposed outwardly of the core. In fact, the segments 41 and 42 are complementary in shape to the segments 39 and 40. A mounting opening 43 is formed in the core adjacent one end of the axis 24 and close to the apex formed by the peripheral segments 41 and 42 so as to be radially outward of the slots. Additional mounting openings 44 and 45 are formed in the projections 37 and 38 respectively and are disposed radially outwardly of the yoke section 16. It will be noted that the angular distance between mounting opening 43 and each of the mounting openings 44 and 45 respectively is somewhat larger than the angular distance between the mounting openings 44 and 45. We have found that for best overall results in utilizing the advantages of the present invention, the angular distance between the openings 44 and 45 should be somewhat less than 90 mechanical degrees. By way of example, in the particular stator illustrated the angular distance between openings 44 and 45 is 60°. The angular distance from opening 43 to each of the openings 44 and 45 is 150°.

Also, the mounting openings are symmetric with respect to axis 24. That is, opening 43 is on the axis while openings 44 and 45 are spaced 30° to either side of the axis. While mounting opening 43 is disposed within the radially outer limits of yoke section 16, it is positioned in effect between the ends of adjacent main winding coil groups where there will be a minimum interference by the main winding end turns with assembly of the mounting bolt into opening 43. Mounting openings 44 and 45, which are adjacent the sides of main winding coil groups, are outside the yoke section and located away from coil end turns. Thus the present arrangement provides for excellent utilization of the yoke section and minimum potential interference by the winding end turns, even when pressed back in the manner shown in FIG. 2, with installation of mounting bolts or other mounting means in these openings.

It will be understood that the mounting openings are adapted to receive elongated bolts or equivalent means for mounting the stator in an overall structure. These bolts also may be used to assist in holding the laminations 15 in the proper stacked relation. However, the laminations may also be held in the proper stacked relationship by any other suitable means, such as a number of welds extending longitudinally of the core or by the use of interlaminate adhesive material to form a bonded core, such as described in U.S. Pat. No. 3,299,304, issued to Bobbie B. Hull on Jan. 17, 1967, and assigned to General Electric Company, assignee of the present invention. However, in a number of applications such as hermetic motors, regardless of the means used for securing the stator laminations together, it is most common to mount the stator by means of bolts or similar mounting members.

It is also highly desirable to provide clearance between the openings and the main winding end turns so as to provide sufficient space for installing the bolts into the openings and any associated nuts and room for tools to accomplish this mounting. Also, for a number of well-known reasons, such as a reduction in the overall length of the stator, it is often quite desirable to press the end turns outwardly over the end faces of the stator in the way revealed by FIG. 2. In the conventional round stator this press back would intensify the space problems. For instance, as graphically seen in FIG. 3, any attempt to press back the end turns in a given size stator would tend to cause interference of the end turns with the satisfactory utilization of the mounting openings.

Since mounting opening 43 is between main winding coil groups in the illustrated exemplification of FIG. 1, there is sufficient clearance around it, even when the end turns are pressed back. Similarly, as the mounting openings 44 and 45 are outside the yoke sections, there also is sufficient clearance between them and a pressed-back winding end turn. As will be seen from a further comparison of FIG. 2 and FIG. 3, this is accomplished in the a manner which only slightly increases one dimension of the core, that is along radial axis 24 disposed intermediate openings 44, 45 and extending through the rotational axis of the rotatable member.

Figure 2:
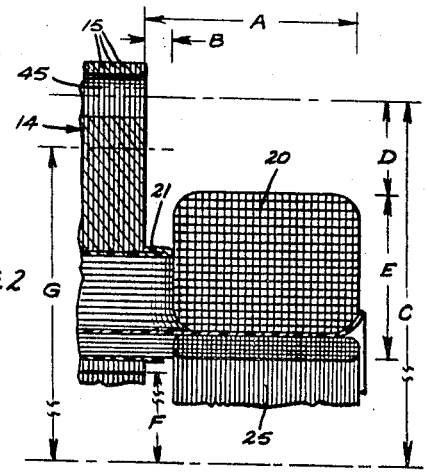
FIG. 2 is a somewhat schematic, partial view taken along the line 2-2 of FIG. 1, and illustrating the relative size of various portions of the stator.

FIG. 2 illustrates somewhat schematically a portion of the stator of FIG. 1 to show various dimensions of one stator manufactured in accordance with the preferred embodiment of the present invention. In FIG. 2 the illustrated dimensions are as follows:

Letter:                                   Dimensions

A _____ Coil end turn height.
B _____ Spacing of coil end turn from core end face.
C _____ Mounting opening center line distance from core center line.
D _____ Clearance between mounting opening center line and coil end turn.
E _____ End turn thickness.
F _____ Bore radius.
G _____ Peripheral radius of a generally round stator core.

A representative turn distribution for the illustrated stator of the exemplification is 33, 40, 46, and 46 turns (inside coil to outside coil) from 0.0359 diameter copper magnet wire in each main winding core group. In the start winding coil groups, the turns of 0.0159 magnet copper wire from inside to outside coil are 18, 41, and 68, with the outer coil having 26 backward turns (current flow opposed to the 68 turns) to produce a backlash-type start winding arrangement.

Figure 3:
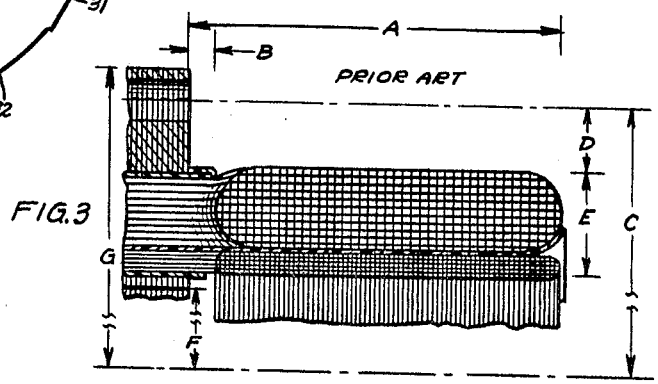
FIG. 3 is a somewhat schematic view, partially in cross section, similar to FIG. 2 but showing a portion of a conventional "Prior Art" stator having a generally circular circumferential configuration for the same application as that of FIGS. 1 and 2.

As noted previously, FIG. 3 is a somewhat schematic view, partially in cross section, showing a portion of a conventional so-called round stator for the same application as that of FIG. 2, the view being taken through one of four equally spaced apart mounting openings. For ease in comparison the same dimensional letters have been used in FIGS. 2 and 3. The following table shows a comparison of these dimensions for a stator of a given size for use in the same application:

|   | Figure 2, in. | Figure 3, in. |
|---|---|---|
| A | 1.100 | 1.780 |
| B | 0.125 | 0.125 |
| C | 2.105 | 1.800 |
| D | 0.335 | 0.310 |
| E | 0.750 | 0.470 |
| F | 0.961 | 0.961 |
| G | 1.795 | 1.795 |

The motor of the exemplification, having a winding distribution similar to that previously mentioned and the above dimensions listed under FIG. 2, was rated at one-fourth horsepower. It operated with a full load efficiency of 73 percent, a power factor of 72 percent, and a full load current of 3.1 amperes, the three more important operational characteristics. The efficiency and power factor are higher and the current lower than those characteristics of a conventional stator of the same rating and stack length having the dimensions listed above under FIG. 3 in spite of the decreased overall axial length for the stator of FIG. 2. It will thus be appreciated from the foregoing, that among other benefits, the present lamination and core construction when incorporating the preferred form of the present invention provides a stator which makes very efficient use of material to effect savings in material for a given size unit and provides excellent operational characteristics. It also permits a rapid and satisfactory mounting of the stator onto appropriate supporting structures.

Figure 4:
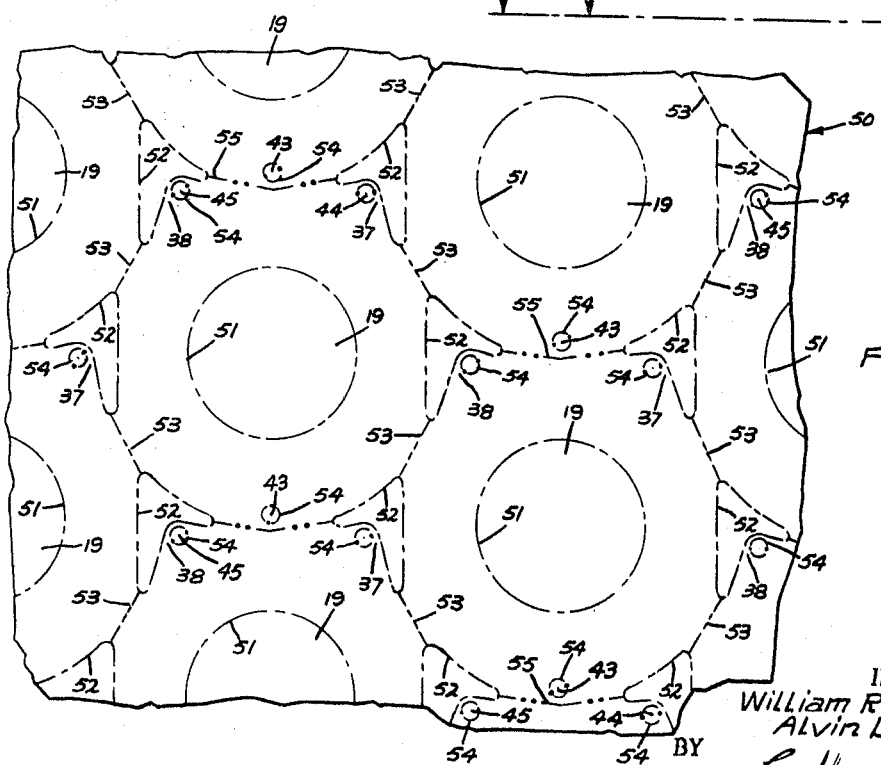
FIG. 4 is a plan view of a lamination arrangement for the core of FIGS. 1 and 2 by which a number of laminations may be efficiently and effectively severed in closely nested relationship.

Referring now to FIG. 4 there is illustrated both a layout and a schematic representation of procedures that may be followed in severing a plurality of blanks in nested relation from a single sheet of magnetic material 50 to form a plurality of laminations 15 in an efficient manner while effectively utilizing a maximum amount of the magnetic sheet 50. A plurality of spaced apart holes are punched in the magnetic material 50 along the lines 51 to provide a plurality of bores 19. It will be noted from FIG. 4 that these bores are provided in evenly spaced staggered rows. A plurality of cutouts are punched along lines 52 with a pair of these cutouts being spaced from each bore to form the projections 37 and 38 associated with each bore, with one projection being spaced on each side of each row of bores and between each successive pair of bores. As indicated by the fact that both the lines 51 and 52 are in the form of two long dashes separated by a short dash (— — —), both the bores 19 and the projections may be formed at the same time.

Next the sheet 50 is severed along the lines 53 between each cutout and the next adjacent cutouts intermediate the rows of bores. The fact that this severing may be done in a second step is indicated by the lines 53 being in the form of two long dashes separated by two short dashes (— – – —). Next the mounting openings 43, 44, and 45 are punched along the lines 54. The mounting openings 44 and 45 are provided in corresponding projections 37 and 38 respectively while one of the mounting openings 43 is positioned generally between each pair of projections 37 and 38 and generally in alignment with each row of bores 19. The lines 54 are in the form of dashes separated by single dots (— . —) to indicate this third punching step.

Then the magnetic material is severed between each pair of cutouts, that is between each pair of the lines 52 along a line 55 which is disposed between the associated first mounting opening 43 and the associated second and third mounting openings 44 and 45. This fourth punching process is indicated by the lines 55 being in the form of two dashes separated by two dots (— .. —).

With this manner of laying out the blanks or laminations on the sheet of magnetic material and severing them generally in the manner described a number of laminations may be efficiently provided from a single sheet of magnetic material in such a way as to effectively utilize a maximum amount of the material. In fact the cutouts formed by severing along lines 52 and the punchings which form the mounting openings 43, 44, and 45 are substantially all of the scrap material. The punchings removed along the lines 51 to form the bores 19 are subsequently used to construct the secondary member or rotor 11. Conveniently these punching operations may be accomplished by one or more progressive presses utilizing a long strip of magnetic material which is fed through the press in steps.

It will be understood that a number of modifications may be made in the above-described manufacturing procedures while remaining within the true spirit and scope of the present invention. For instance, a number of bores 19 and the adjacent cutouts forming associated projections 37 and 38 may be punched simultaneously or in sequence. Also, once the material has been severed along the lines 53, the rows of bores and surrounding magnetic material are effectively separated into strips. Thereafter, the strips may be fed through a single multidie progressive press so that the remaining punching operations are substantially simultaneously accomplished on the various rows. On the other hand, they may be separated and fed through separate presses so that the additional punchings of each row are accomplished independently of the punchings of the other rows. The winding receiving slots 17 conveniently may be punched at the same time the mounting openings are punched; however, they have not been shown in FIG. 4 both in order to simplify the drawing of FIG. 4 and since the same basic core lamination, such as that illustrated in FIG. 4, could be used in a number of dynamoelectric machines which may vary only in the number and configuration of the slots. Some users may find it beneficial to provide the various cutting operations through the severing of the material into rows and then punch different slots in the different rows in order to form laminations for various model motors.

It will also be recognized by those skilled in the art that while we have described and illustrated certain aspects of the present invention in connection with the stator for a single-phase two-pole motor, the disclosed principles are equally applicable to other arrangements. For instance, the number of poles may vary from that shown. Also, the windings may be of multiphase type with adjacent polar centers being located at other than 90 electrical degrees. Further, the motor may be of the multivoltage or multispeed type if desired. Therefore, it will be obvious that changes and modifications may be made in the disclosed preferred embodiment without departing from our invention, and it is aimed in the appended claims to cover all such changes and modifications as fall within the true spirit and scope of the invention.

We claim:

1. A dynamoelectric machine stator having a core formed of magnetic material, said core comprising a yoke section, a bore disposed radially inward of such yoke section and a plurality of angularly spaced apart elongated winding receiving slots extending inwardly from said yoke section; said core having means for securing the stator to a mounting structure, said means for securing including a first longitudinally extending mounting opening disposed radially outward of said slots at a first distance from the center of the bore, and including second and third longitudinally extending mounting openings disposed radially outwardly from the center of the bore at distances different than the first distance; the angular distance between said first mounting opening and each of said second and third mounting openings respectively being somewhat greater than the angular distance between said second and third mounting openings.

2. A stator as set forth in claim 1 wherein each of said second and third mounting openings is formed in a portion of said magnetic core material extending radially outwardly of said yoke section.

3. A dynamoelectric machine stator having a core formed of magnetic material, said core comprising a yoke section, a bore disposed radially inward of said yoke section and a plurality of angularly spaced apart elongated winding receiving slots extending inwardly from said yoke section; a winding having at least two polar coil groups disposed in predetermined ones of said slots and defining an axis extending between adjacent coil groups; said core having a first longitudinally extending mounting opening disposed adjacent one end of said axis and located a first radial distance from the center of the bore, and second and third longitudinally extending mounting openings disposed radially outward of said yoke section and located from the center of the bore radial distances different than said first radial distance; said second and third mounting openings being respectively positioned on opposite sides of the other end of said axis so that the angular distance between said first mounting opening and each of said second and third mounting openings respectively is somewhat greater than the angular distance between said second and third mounting openings.

4. A stator as set forth in claim 3 wherein each of said second and third mounting openings is angularly positioned from said other end of said axis no more than about 45°.

5. A dynamoelectric machine stator having a core formed of magnetic material; said core comprising a yoke section, a bore disposed radially inward of said yoke section and a plurality of angularly spaced apart elongated winding receiving slots extending inwardly from said yoke section; said magnetic core material including first and second portions disposed radially outwardly of said yoke section and having means for mounting the stator to a supporting structure, said means for mounting the stator including first and second longitudinally extending openings for receiving mounting members, said first and second openings being spaced apart an angular distance less than 90°.

6. A stator as set forth in claim 5 wherein said core has a third mounting opening disposed radially outward of said slots; said third mounting opening being angularly spaced substantially equidistant from each of said first and second mounting openings respectively.

7. A stator as set forth in claim 5 further including a first winding having at least two polar coil groups disposed in predetermined ones of said slots and a second winding having at least two polar coil groups disposed in predetermined ones of said slots angularly displaced from said polar coil groups of said first winding.

8. A lamination, for use in a stator of a dynamoelectric machine, comprising a yoke section, a bore disposed radially inward of said yoke section and a plurality of angularly spaced apart elongated winding receiving slots extending inwardly from said yoke section; said lamination having a first mounting opening disposed radially outward of said slots, and second and third mounting openings disposed radially outward of said yoke section; the angular distance between said first mounting opening and each of said second and third mounting openings respectively being somewhat greater than the angular distance between said second and third mounting openings; and the outer peripheral surface of said lamination adjacent said first mounting opening being complementary to the outer peripheral surface of said lamination between said second and third mounting openings whereby a number of said laminations may be severed in nested relation from a single sheet of magnetic material.

9. A dynamoelectric machine stator having a core formed of magnetic material with a pair of end faces, and including a yoke section, a plurality of spaced apart winding receiving slots extending from said yoke section and a bore disposed radially inward of said yoke section; a winding having at least two polar coil groups disposed in predetermined ones of said slots and having end turns disposed adjacent the end faces of the core; said core having at least one mounting opening located a first radial distance from the center of the bore, and a pair of other mounting openings located from the center of the bore radial distances different than said first radial distance; the at least one mounting opening and pair of other mounting openings being angularly spaced apart, with the at least one mounting opening being the next adjacent opening on one side and the second one of the other mounting openings being the next adjacent opening on the other side of the first one of the other mounting openings; said at least one mounting opening being located a preselected angular distance from the first one of the other mounting openings and the second one of the other mounting openings being located less than said preselected angular distance from the first one of the other mounting openings; to permit winding end turns in the vicinity of the pair of other mounting openings to be pressed toward a core end face without substantial interference with the pair of other mounting openings and to assist in the effective utilization of the yoke section as a path for magnetic flux associated with excitation current in the winding.